United States Patent
Holby (10) Patent No.: US 10,426,100 B2
(45) Date of Patent: Oct. 1, 2019

(54) DRAINAGE COLLECTION CONTAINER

(71) Applicant: Plantlogic LLC, Smyrna, GA (US)

(72) Inventor: Israel Holby, Sharpsburg, GA (US)

(73) Assignee: Plantlogic LLC, Smyrna, GA (US)

( * ) Notice: Subject to any disclaimer, the term of this patent is extended or adjusted under 35 U.S.C. 154(b) by 196 days.

(21) Appl. No.: 15/584,230

(22) Filed: May 2, 2017

(65) Prior Publication Data

US 2018/0317399 A1    Nov. 8, 2018

(51) Int. Cl.
| | |
|---|---|
| *A01G 9/02* | (2018.01) |
| *A01G 9/04* | (2006.01) |
| *A01G 25/00* | (2006.01) |
| *A01G 9/00* | (2018.01) |
| *A01G 27/00* | (2006.01) |

(52) U.S. Cl.
CPC ............... *A01G 9/02* (2013.01); *A01G 9/047* (2013.01); *A01G 9/00* (2013.01); *A01G 25/00* (2013.01); *A01G 27/00* (2013.01)

(58) Field of Classification Search
CPC . A01G 9/021; A01G 9/02; A01G 9/10; A01G 9/022; A01G 9/026; A01G 9/028; A01G 9/1066; A01G 9/027; A01G 9/042; A01G 9/1073; Y02P 60/216; Y02P 60/642; Y10T 137/5762; Y10T 137/5835; Y10T 137/5907; B65D 21/0209; B65D 21/0233; B65D 21/0219; B65D 21/0204; B65D 21/0212; B65D 21/0215; B65D 25/24; B65D 1/34; B65D 21/02; B65D 21/022; B65D 21/0223; B65D 21/0235; B65D 25/06; B65D 81/264; B65D 85/34

USPC ......... 47/65.5, 65.7, 66.7, 86; 220/571, 676, 220/560.3, 572
See application file for complete search history.

(56) References Cited

U.S. PATENT DOCUMENTS

| | | | | |
|---|---|---|---|---|
| 869,523 | A * | 12/1906 | Schmidt | A01G 9/02 47/65.5 |
| 2,854,790 | A * | 10/1958 | Hartung | A01G 9/021 206/520 |
| 6,783,023 | B1 * | 8/2004 | Fan | A01G 9/02 206/423 |
| 7,216,769 | B2 * | 5/2007 | Palder | B65D 1/22 211/49.1 |
| 7,624,535 | B2 * | 12/2009 | Schmidt | A01G 9/021 206/423 |
| 8,281,517 | B2 * | 10/2012 | MacKenzie | A01G 9/025 47/82 |
| 2009/0119988 | A1 * | 5/2009 | Berrie | A01G 9/02 47/80 |

FOREIGN PATENT DOCUMENTS

AU    2015372455 A1 *   3/2017   ............... A01G 9/02

OTHER PUBLICATIONS

Photographs of prior art containers, taken on or about Sep. 2015. (4 pages).

* cited by examiner

*Primary Examiner* — Peter M Poon
*Assistant Examiner* — Jeffrey R Larsen

(57) ABSTRACT

A system, method and apparatus for a container for a plant includes a body having a vertical axis, an open top, a base, a sidewall extending upward from the base, holes in the base and legs extending downward from the base. The holes comprise elongated slots and apertures that intersect each other.

18 Claims, 7 Drawing Sheets

DRAINAGE COLLECTION CONTAINER

BACKGROUND OF THE INVENTION

Field of the Disclosure

The present invention relates in general to containers and, in particular, to a system, method and apparatus for drainage collection containers for plants.

Description of the Prior Art

Drainage collection from potted plants is valuable for growers that wish to control the disposal of waste water (drainage) for environmental protection, or to reuse the solution which contains salt and fertilizer. Generally, the drainage is collected into holding ponds where solids precipitate out, or it is diluted with clean water and then applied to in-ground crops. Alternatively, in the case of very dry environments, it is reused after passing through or mixing with water that has passed through a reverse osmosis system.

On a larger scale, this type of drainage can cause environmental pollution if allowed to flow into rivers, streams and groundwater. Fertilizer from golf courses and other agriculture is already being blamed for algae blooms. Several countries, especially in Europe, have passed regulations that require growers to collect waste water that contains fertilizer. These regulations will start to be enforced within several years in some countries.

Some growers place their pots in wide gutters to collect drainage. However, wide gutters have some disadvantages. For example, a gutter as wide as or wider than the pot is expensive and requires near-perfect grading over a large area. In addition, evaporation occurs in wide gutters. Evaporation wastes water and increases the humidity within greenhouses, which can affect flowering, fruiting and encourage some plant diseases. Leaves and other debris also can more readily accumulate in wide gutters, which impedes flow through the gutter and causes water to pool. Thus, improvements in drainage collection containers for plants continue to be of interest.

SUMMARY

Embodiments of a system, method and apparatus for a container for a plant are disclosed. For example, a container for a plant includes a body having a vertical axis, an open top, a base, a sidewall extending upward from the base, holes in the base and legs extending downward from the base. The holes comprise elongated slots and apertures that intersect each other.

In another embodiment, the container includes a body having a vertical axis, an open top, a base, a sidewall extending upward from the base, holes in the base, and legs extending downward from the base. The base and sidewall form a unitary, contiguous body such that the base is not separable from the sidewall. The holes include a first set of holes at a lower vertical elevation configured to permit liquid drainage from the container, and a second set of holes at an upper vertical elevation configured to substantially only permit air uptake to roots of a plant in the container and configured to not facilitate liquid drainage from the container.

Embodiments of containers include a first container having a vertical axis, an open top, a base, a sidewall extending upward from the base, holes in the base, and legs extending downward from the base. A second container is stacked inside the first container to form a stack of containers. The second container has legs that are visible from an exterior of the container, and the first and second containers comprise two different types of containers that differ from each other.

Embodiments of a container assembly include a container having a vertical axis, an open top, a base, a sidewall extending upward from the base, holes in the base, and legs extending downward from the base. The base and sidewall form a unitary, contiguous body such that the base is not separable from the sidewall. A gutter is configured to collect drainage from the container. The gutter has a width that is narrower than a width of a space between the legs of the container. The gutter has a length is greater than that of the container.

Embodiments of a method of stacking containers for plants include providing Type A plant containers and Type B plant containers, wherein the Type A plant containers differ from the Type B plant containers; placing a first Type B plant container inside a first Type A plant container; orienting a second Type A plant container in a direction that differs from a direction of the first Type A plant container, and placing the second Type A plant container inside the first Type B plant container; and orienting a second Type B plant container in a direction that differs from a direction of the first Type B plant container, and placing the second Type B plant container inside the second Type A plant container to form a stack of containers.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

The use of the same reference symbols in different drawings indicates similar or identical items.

DETAILED DESCRIPTION

Embodiments of a system, method and apparatus for a container for a plant are disclosed. For example, FIGS. 1-5 depict one version of a container 21 having a body with a vertical axis 23 (FIGS. 3 and 4), an open top 25, a base 27, a sidewall 29 extending upward from the base, and legs 31 extending downward from the base 27. In some versions, the legs 31 comprise a plurality of flat fins that are parallel to the axis 23 and/or to each other. Embodiments of the legs 31 can be not symmetrically arrayed with respect to each other. Each leg 31 may comprise reinforcement ribs.

In some examples, the container 21 is polygonal, the sidewall 29 comprises a plurality of sidewalls, and a trough 37 extends between opposite sidewalls 29. Trough 37 can intersect vertical axis 23. Embodiments of the base 27 are non-planar and have a lowermost depth extending along the trough 37. The trough 37 can be central and extend across an entire length of the base 27. The trough 37 can be at a different vertical elevation (relative to vertical axis 23) than other portions of the base 27. Embodiments of the base 27 are tapered in at least two directions. For example, outer sides 39 of the base 27 can taper downward such that an axially lowest portion of the base 27 is located at a center of the base along the trough 37, and an axially highest portion of the base is located at the outer sides 39 along the side wall 29.

Figure 1:
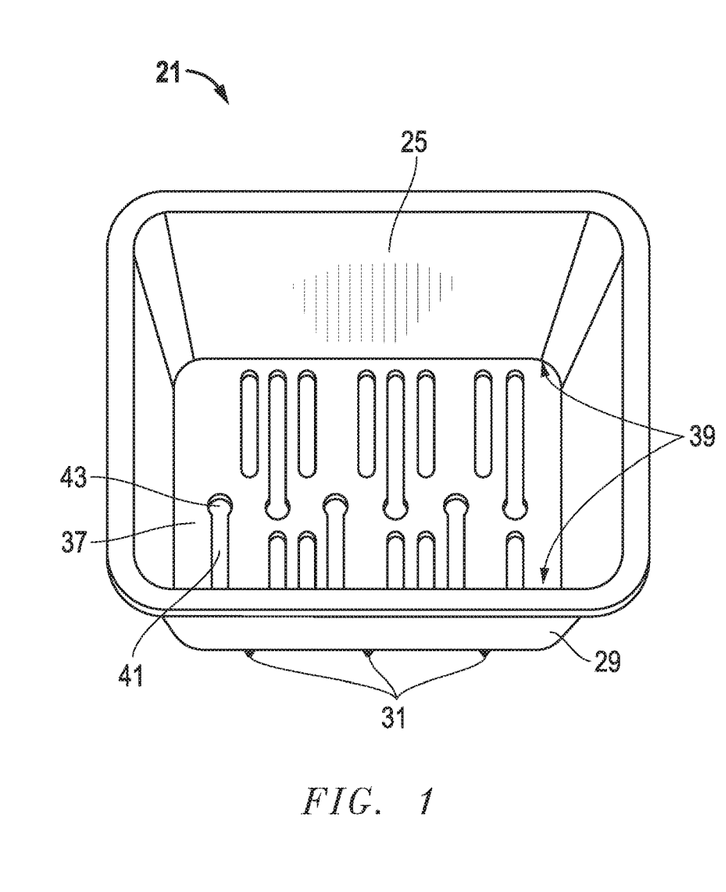
FIG. 1 is a top isometric view of an embodiment of a container for a plant.
Figure 2:
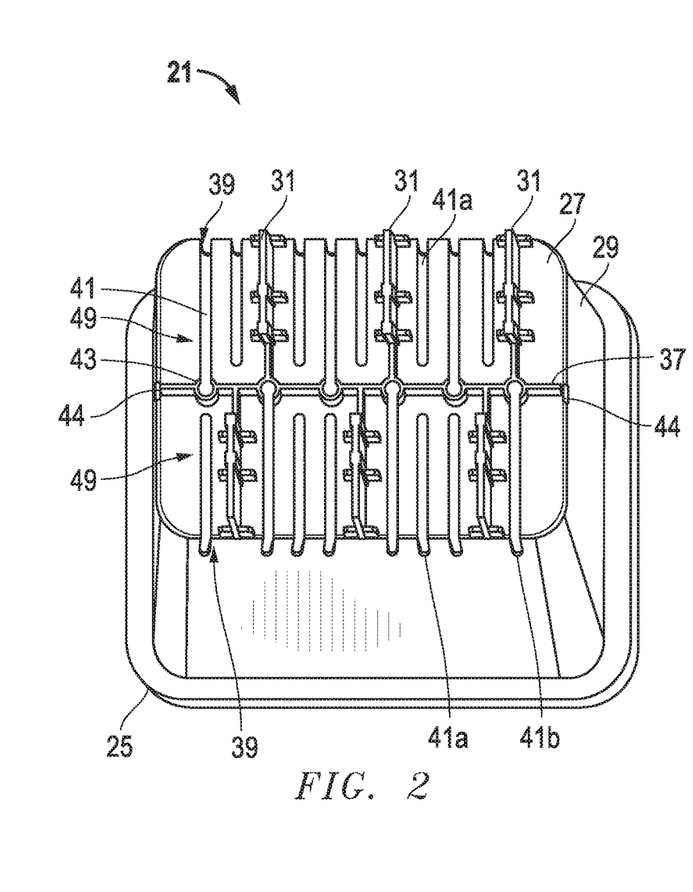
FIG. 2 is a bottom isometric view of the container of FIG. 1.
Figure 3:
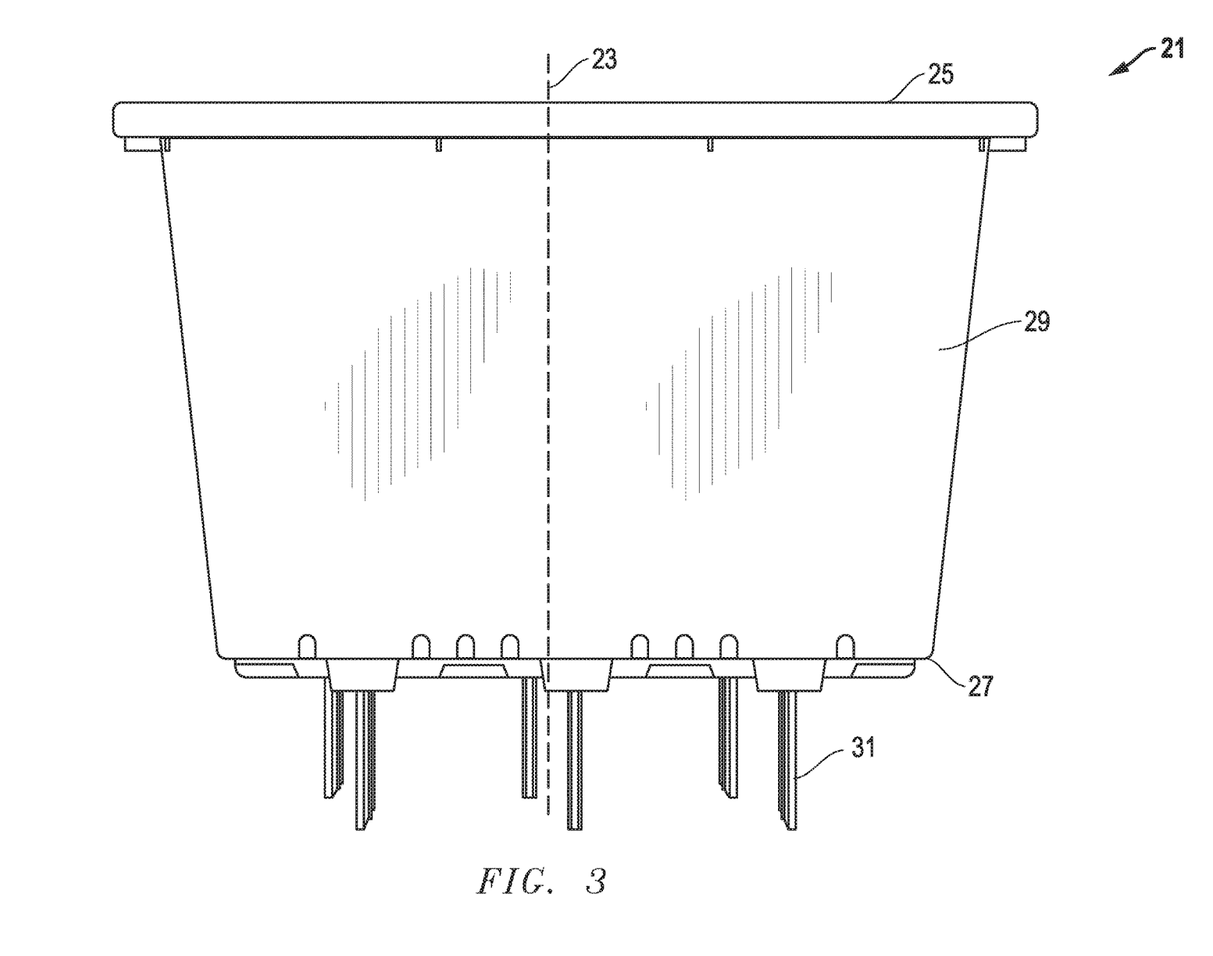
FIG. 3 is a side view of the container of FIG. 1.
Figure 4:
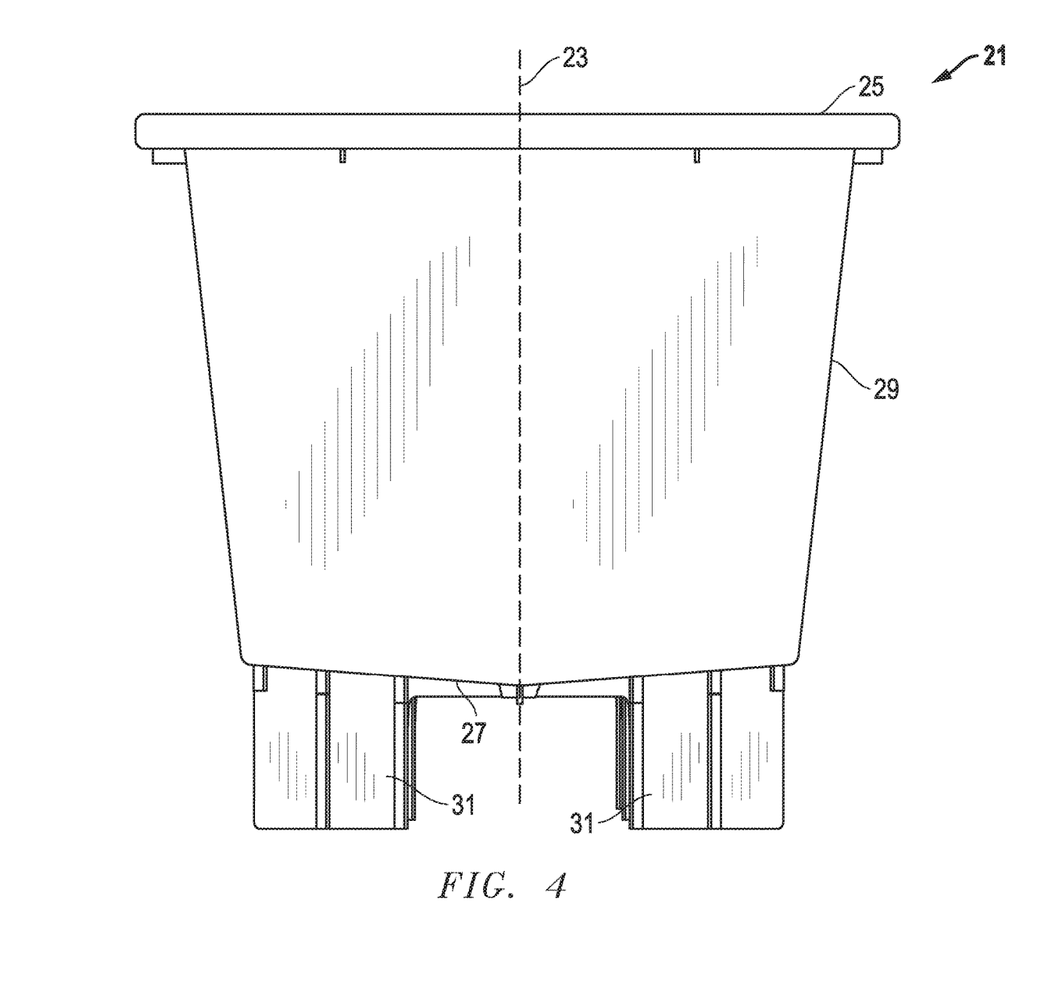
FIG. 4 is an end view of the container of FIG. 1.

Embodiments of container 21 include holes, such as in the base 27. In some versions, the holes comprise elongated slots 41 and apertures 43 that can intersect each other. As shown in FIG. 2, some of the holes (e.g., elongated slots 41a) can be co-linear with other holes (e.g., elongated slots 41a). Other ones of the holes (e.g., elongated slots 41b) are co-linear with the legs 31. At least some of the elongated slots 41 may extend up the sidewalls 29, as shown. Still other holes, such as end holes 44, may be formed in container 21. For example, one end hole 44 may be located at each end of trough 37.

Versions of the container 21 can include planes 49 defined by at least some of the holes (e.g., apertures 43, and/or elongated slots on the same side of trough 37). Examples of the planes can be parallel to each other. Other versions of the container 21 include planes 49 defined by at least some of the holes (e.g., elongated slots on opposite sides of trough 37) that are skewed relative to each other.

Figure 5:
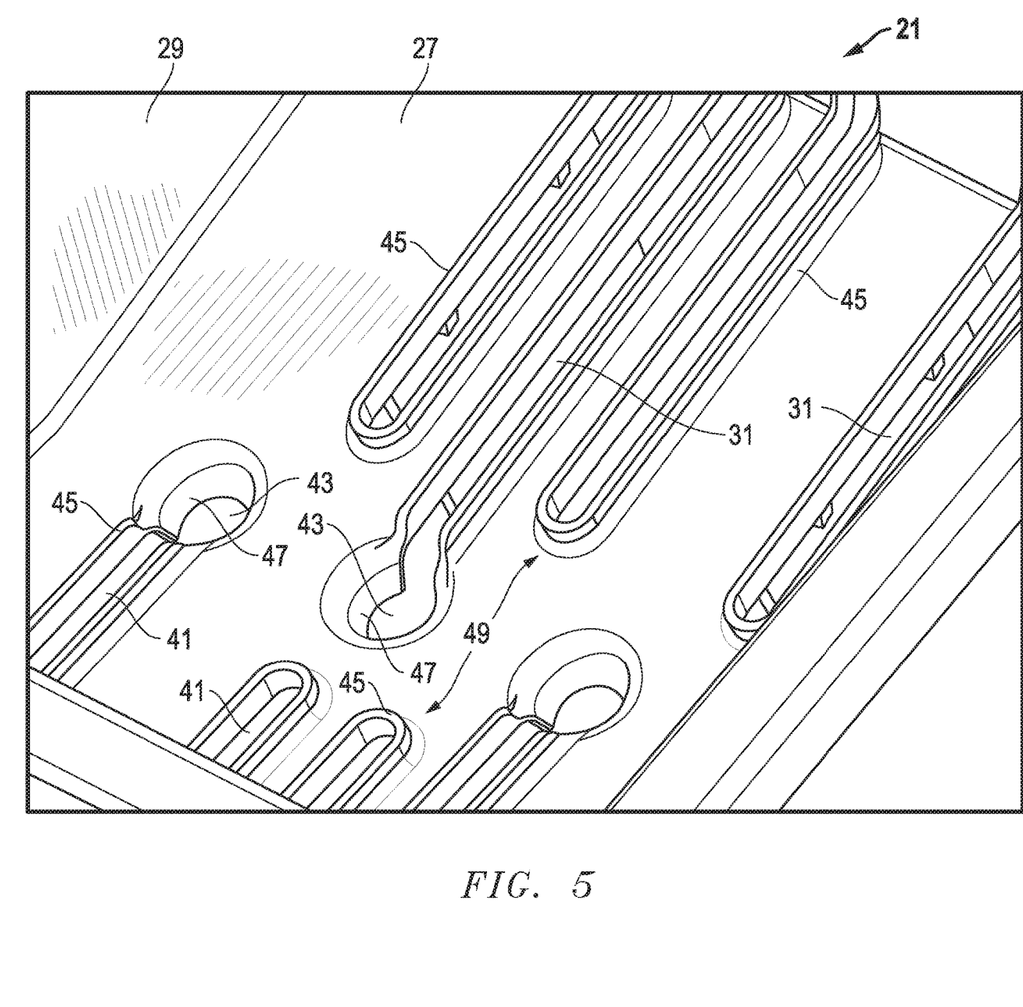
FIG. 5 is an enlarged interior view of the container of FIG. 1.

In some embodiments, the container 21 includes at least some holes with walls that extend therefrom in a generally vertical axial direction. For example, elongated slots 41 can have walls 45 (FIG. 5), and apertures 43 can have walls 47. The walls 45, 47 may be located at perimeters of the holes. In some versions, at least some of the walls 45, 47 are oriented in different directions (e.g., opposite directions). The walls 45, 47 may comprise various shapes, such as at least one of rectilinear, curvilinear, cylindrical or conical. As shown in FIG. 5, at least some of the holes are completely circumscribed by their respective walls 45, and other ones of the holes are not completely circumscribed by their respective walls 45, 47. In an example, the holes comprise the circular apertures 43 having downward extending walls 47, and the holes comprise the linear, elongated slots 41 having upward extending walls 45.

In addition, at least some of the holes differ from each other in length, planar orientation and shape. In some examples, at least some of the holes are asymmetrically arrayed. The holes can be linearly aligned, such as apertures 43 along trough 37. The trough 37 can be at a substantially constant vertical elevation with respect to the vertical axis 23, such that the apertures 43 in the trough 37 are substantially co-planar. A convex crease can linearly bisect the trough 37, such that at least some of the elongated slots 41 are inclined relative to the vertical axis 23.

Another example of the container includes holes that comprise rows of holes that define vertical planes. The vertical planes are parallel to each other and perpendicular to a vertical plane defined along the length of the trough 37.

Embodiments of the container 21 may include a first set of holes (e.g., apertures 43) at a lower vertical elevation configured to permit liquid drainage from the container 21. A second set of holes (e.g., elongated slots 41) may be located at an upper vertical elevation configured to substantially only permit air uptake to roots of a plant in the container 21 and configured to not facilitate liquid drainage from the container.

As shown in FIG. 5, one or more of the containers 21 may be array such that their respective holes are elevated above an underlying support surface of the legs 31 of the containers 21. A gutter 51 may be used to collect drainage from the containers 21. The gutter 51 can have a width that is narrower than a width of a space between the legs 31 of each of the containers 21, and the gutter 51 can have a length is greater than that of the containers 21.

Figure 6:
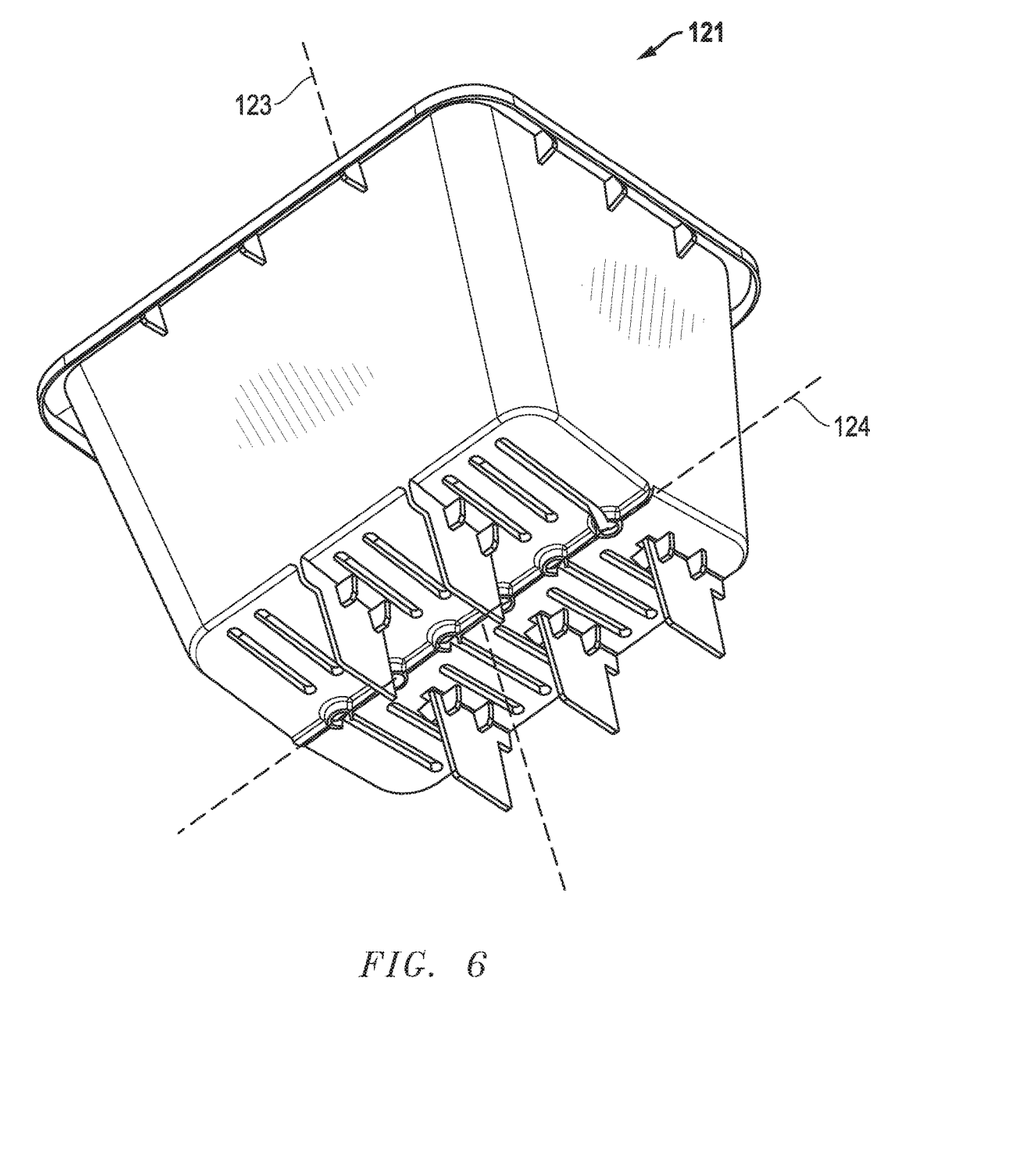
FIG. 6 is a lower isometric view of another embodiment of a container for a plant.
Figure 7:
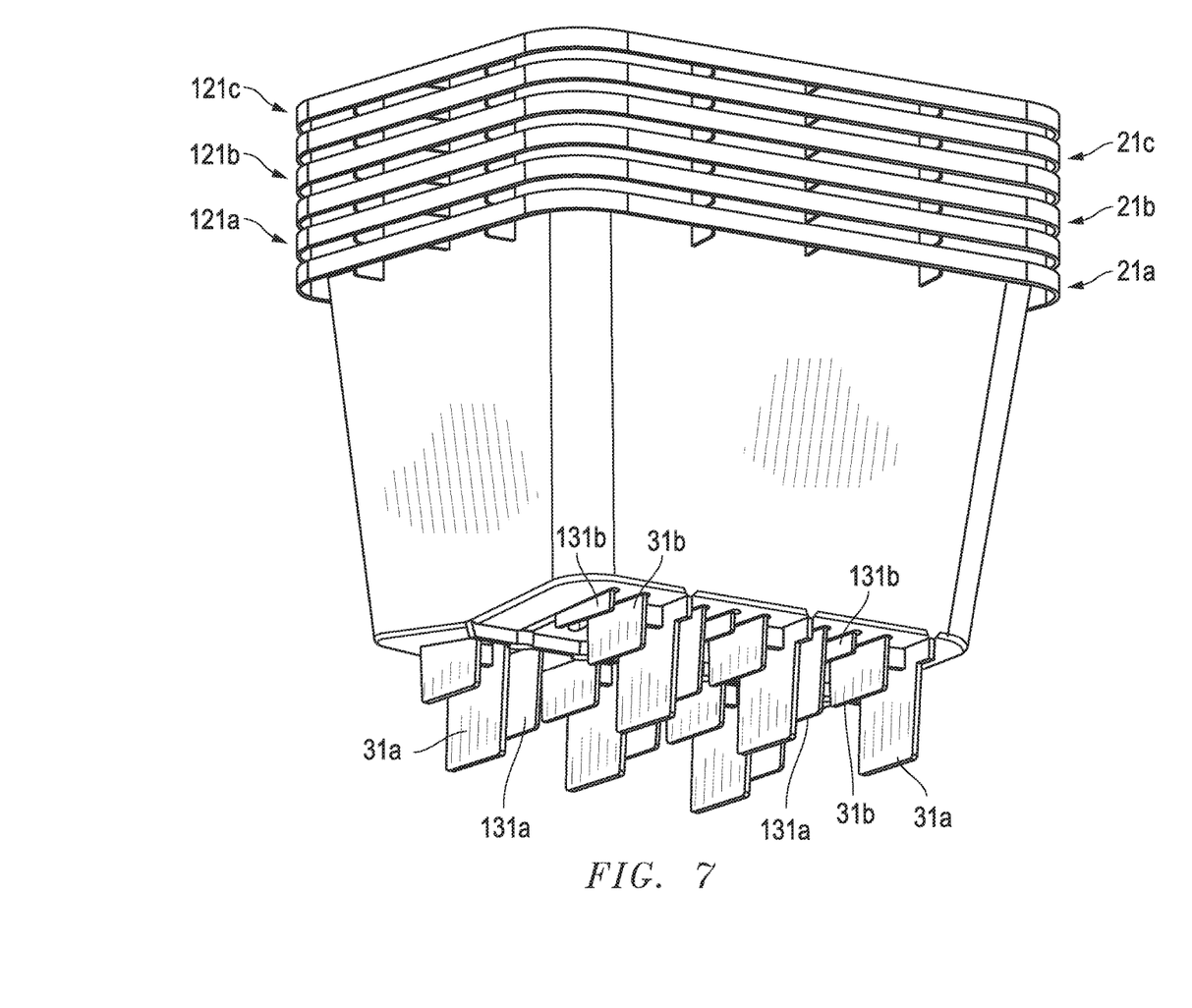
FIG. 7 is a lower isometric view of an embodiment of an alternating stack of the containers of FIGS. 1 and 6.

FIGS. 6 and 7 depict another embodiment of a container 121 for a plant. Overall, the container 121 can be very similar to container 21 and share many of the same features. Containers 21, 121 are not necessarily identical, and may even comprise two different types of containers. For example, container 121 can be generally rectangular in shape and comprise a vertical axis 123 and a longitudinal axis 124 that is perpendicular to the vertical axis 123. The longitudinal axis 124 can bisect a length of the container 121. Embodiments of container 121 can have an unequal number of legs 131 on opposite sides of the longitudinal axis 124, whereas container 21 has an even number of legs 31 on each side of its longitudinal axis.

Containers 21, 121 may be stacked together. For example, in FIG. 7, three containers 21 (i.e., containers 21a, 21b, 21c) and three containers 121 (i.e., containers 121a, 121b, 121c) are stacked together. In some embodiments, when containers 121a and 21b are stacked inside container 21a to form a stack of three containers, the legs 131a, 31b of the containers 121a, 21b, respectively, are visible from an exterior of the container 21a. In other embodiments, when containers 121a, 21b and 121b are stacked inside container 21a to form a stack of four containers, the legs 131a, 131b and 131b of the containers 121a, 21b and 121b, respectively, are visible from an exterior of the container 21a. The containers 21a, 21b can be substantially identical, and the containers 121a, 121b can be substantially identical and differ from the containers 21a, 21b.

Embodiments of a method of stacking containers for plants include providing Type A plant containers (e.g., containers 21) and Type B plant containers (e.g., containers 121). The Type A plant containers differ from the Type B plant containers. The method includes placing a first Type B plant container inside a first Type A plant container; orienting a second Type A plant container in a direction that differs from a direction of the first Type A plant container, and placing the second Type A plant container inside the first Type B plant container; orienting a second Type B plant container in a direction that differs from a direction of the first Type B plant container, and placing the second Type B plant container inside the second Type A plant container to form a stack of containers. In some versions, legs of the first and second Type B plant containers and legs of the second Type A plant container extend beneath a bottom of and are visible from an exterior of the first Type A plant container.

Embodiments of the container (e.g., 21) for a plant may include the base 27 and sidewall 29 forming a unitary, contiguous body such that the base 27 is not separable from the sidewall 29. The holes include a first set of holes 43 at a lower vertical elevation configured to permit liquid drainage from the container 21, and a second set of holes 41 at an upper vertical elevation configured to substantially only permit air uptake to roots of a plant in the container 21, and configured to not facilitate liquid drainage from the container 21.

Figure 8:
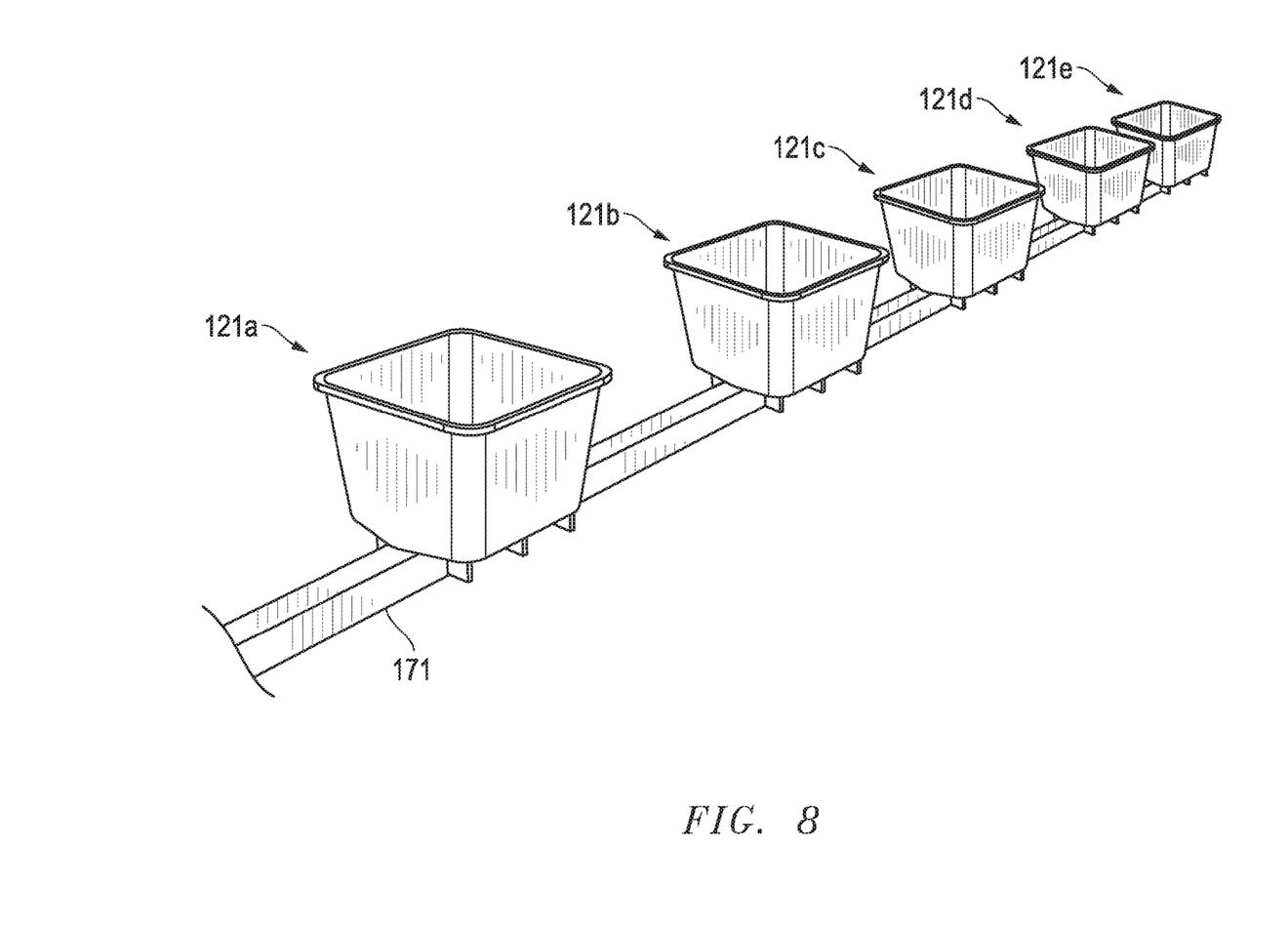
FIG. 8 is an isometric view of an embodiment of a series of plant containers with a gutter for drainage collection from the plant containers.

As shown in FIG. 8, some embodiments include a gutter 171 configured to collect drainage from one or more of the containers 21 or 121. In this example, five containers 121a through 121e are depicted. The gutter 171 has a width that can fit between the legs of each of the containers 121a-e, and the gutter 171 has a length is greater than that of the containers 121a-e, as illustrated.

Other versions may include one or more of the following embodiments:

Embodiment 1. A container for a plant, the container comprising:
  a body having a vertical axis, an open top, a base, a sidewall extending upward from the base, holes in the base and legs extending downward from the base; and
  wherein the holes comprise elongated slots and apertures that intersect each other.

Embodiment 2. The container of any of these embodiments, wherein the legs comprise a plurality of flat fins that are parallel to each other.

Embodiment 3. The container of any of these embodiments, wherein the legs are not symmetrically arrayed with respect to each other.

Embodiment 4. The container of any of these embodiments, wherein when second and third containers are stacked inside the container to form a stack of three containers, the legs of the second and third containers are visible from an exterior of the container.

Embodiment 5. The container of any of these embodiments, wherein when second, third and fourth containers are stacked inside the container to form a stack of four containers, the legs of the second, third and fourth containers are visible from an exterior of the container.

Embodiment 6. The container of any of these embodiments, wherein the containers are not identical.

Embodiment 7. The container of any of these embodiments, wherein the containers comprise two different types of containers.

Embodiment 8. The container of any of these embodiments, wherein the first and third containers are substantially identical, and the second and fourth containers are substantially identical and differ from the first and third containers.

Embodiment 9. The container of any of these embodiments, wherein the base is non-planar and has a lowermost depth extending along a central trough across an entire length of the base.

Embodiment 10. The container of any of these embodiments, wherein the container is rectangular in shape and comprises a longitudinal axis that is perpendicular to the vertical axis, the longitudinal axis bisects a length of the container, and there is an unequal number of legs on opposite sides of the longitudinal axis.

Embodiment 11. The container of any of these embodiments, wherein some of the holes are co-linear with other holes, and other ones of the holes are co-linear with the legs.

Embodiment 12. The container of any of these embodiments, wherein planes defined by at least some of the holes are parallel to each other.

Embodiment 13. The container of any of these embodiments, wherein planes defined by at least some of the holes are skewed relative to each other.

Embodiment 14. The container of any of these embodiments, wherein at least some of the holes have walls that extend therefrom in a generally vertical axial direction.

Embodiment 15. The container of any of these embodiments, wherein at least some of the walls are oriented in different directions.

Embodiment 16. The container of any of these embodiments, wherein at least some of the walls are oriented in opposite directions.

Embodiment 17. The container of any of these embodiments, wherein the walls comprise at least one of the following shapes: rectilinear, curvilinear, cylindrical or conical.

Embodiment 18. The container of any of these embodiments, wherein at least some of the holes are completely circumscribed by their respective walls, and other ones of the holes are not completely circumscribed by their respective walls.

Embodiment 19. The container of any of these embodiments, wherein the walls are located at perimeters of the holes.

Embodiment 20. The container of any of these embodiments, wherein the holes comprise circular holes having downward extending walls, and the holes comprise linear holes having upward extending walls.

Embodiment 21. The container of any of these embodiments, wherein at least some of the linear holes are completely circumscribed by their respective walls, and other ones of the linear holes are not completely circumscribed by their respective walls.

Embodiment 22. The container of any of these embodiments, The container of any of these embodiments, wherein at least some of the holes differ from each other in length, planar orientation and shape.

Embodiment 23. The container of any of these embodiments, wherein at least some of the holes are asymmetrically arrayed.

Embodiment 24. The container of any of these embodiments, wherein the base comprises a trough that intersects the axis and the holes are aligned linearly.

Embodiment 25. The container of any of these embodiments, wherein the trough is at a different vertical elevation than other portions of the base.

Embodiment 26. The container of any of these embodiments, wherein the trough is at a substantially constant vertical elevation with respect to the axis, such that holes in the trough are substantially co-planar.

Embodiment 27. The container of any of these embodiments, wherein a convex crease linearly bisects the trough, and at least some of the holes are inclined relative to the vertical axis.

Embodiment 28. The container of any of these embodiments, wherein the holes comprise rows of holes that define vertical planes that are parallel to each other and perpendicular to a vertical plane of the trough.

Embodiment 29. The container of any of these embodiments, wherein the base is tapered in at least two directions.

Embodiment 30. The container of any of these embodiments, wherein outer sides of the base taper downward such that an axially lowest portion of the base is located at a center of the base, and an axially highest portion of the base is located at the side wall.

Embodiment 31. The container of any of these embodiments, wherein the container is polygonal, the sidewall comprises a plurality of sidewalls, and a trough extends between opposite sidewalls.

Embodiment 32. The container of any of these embodiments, wherein the legs are parallel to the axis.

Embodiment 33. The container of any of these embodiments, wherein the holes comprise a first set of holes at a lower vertical elevation configured to permit liquid drainage from the container, and a second set of holes at an upper vertical elevation configured to substantially only permit air uptake to roots of a plant in the container and configured to not facilitate liquid drainage from the container.

Embodiment 34. The container of any of these embodiments, wherein the holes are configured to be elevated above an underlying support surface of the legs of the container.

Embodiment 35. The container of any of these embodiments, further comprising a gutter configured to collect drainage from the container, wherein the gutter has a width that can fit between the legs of the container, and the gutter has a length is greater than that of the container.

Embodiment 36. A container for a plant, the container comprising:
a body having a vertical axis, an open top, a base, a sidewall extending upward from the base, holes in the base, legs extending downward from the base, and the base and sidewall form a unitary, contiguous body such that the base is not separable from the sidewall; and wherein
the holes comprise a first set of holes at a lower vertical elevation configured to permit liquid drainage from the container, and a second set of holes at an upper vertical elevation configured to substantially only permit air uptake to roots of a plant in the container and configured to not facilitate liquid drainage from the container.

Embodiment 37. Containers for plants, the containers comprising:
a first container having a vertical axis, an open top, a base, a sidewall extending upward from the base, holes in the base, legs extending downward from the base; and
a second container stacked inside the first container to form a stack of containers, the second container has legs that are visible from an exterior of the container, and the first and second containers comprise two different types of containers that differ from each other.

Embodiment 38. A container assembly for a plant, the container assembly comprising:
a container having a vertical axis, an open top, a base, a sidewall extending upward from the base, holes in the base, legs extending downward from the base, and the base and sidewall form a unitary, contiguous body such that the base is not separable from the sidewall; and
a gutter configured to collect drainage from the container, wherein the gutter has a width that is narrower than a width of a space between the legs of the container, and the gutter has a length is greater than that of the container.

Embodiment 39. A method of stacking containers for plants, the method comprising:
(a) providing Type A plant containers and Type B plant containers, wherein the Type A plant containers differ from the Type B plant containers;
(b) placing a first Type B plant container inside a first Type A plant container;
(c) orienting a second Type A plant container in a direction that differs from a direction of the first Type A plant container, and placing the second Type A plant container inside the first Type B plant container;
(d) orienting a second Type B plant container in a direction that differs from a direction of the first Type B plant container, and placing the second Type B plant container inside the second Type A plant container to form a stack of containers.

Embodiment 40. The method of any of these embodiments, wherein legs of the first and second Type B plant containers and legs of the second Type A plant container extend beneath a bottom of and are visible from an exterior of the first Type A plant container.

Embodiment 41. A container for a plant, the container comprising:
a body having a vertical axis, an open top, a base, a sidewall extending upward from the base, holes in the base and legs extending downward from the base, wherein the holes comprise slots and apertures;
a gutter configured to collect drainage from apertures of the container; and wherein
the container is configured high drainage pressure area over the gutter to induce drainage through the apertures, and a low drainage pressure area at the slots to maintain areas in a relatively unsaturated condition where drainage from the container is not desired.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

It may be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A container for a plant, the container comprising:
a body having an open top, a base, a sidewall extending upward from the base, holes extending through the base, legs extending downward from the base, and a vertical axis extending from the open top and through the base, wherein the holes comprise a first set of holes each having an opening facing the open top and at a lowest vertical elevation with respect to the vertical axis, the first set of holes comprises downward extending walls from a bottom surface of the base that are configured to induce liquid drainage from the container through the first set of holes, and the holes comprise a second set of holes each having an opening facing the open top and at an upper vertical elevation relative to the first set of holes and with respect to the vertical axis, wherein each of the openings of the first set of holes and each of the openings of the second set of holes form a plane that is perpendicular to the vertical axis, and the second set of holes comprises upward extending walls from a top surface of the base that are configured to substantially only permit air uptake to roots of a plant in the container and configured to not facilitate liquid drainage from the container through the second set of holes; and
a gutter configured to collect drainage from the first set of holes in the container, wherein the gutter has a width that fits between the legs of the container, and the gutter has a length that is greater than that of the container.

2. The container of claim 1, wherein the legs comprise a plurality of flat fins that are parallel to each other.

3. The container of claim 1, wherein the legs are not symmetrically arrayed with respect to each other.

4. The container of claim 1, wherein when second and third containers are stacked inside the container to form a stack of three containers, legs of the second and third containers are visible from an exterior of the container.

5. The container of claim 1, wherein when second, third and fourth containers are stacked inside the container to form a stack of four containers, legs of the second, third and fourth containers are visible from an exterior of the container.

6. The container of claim 1, wherein the base is non-planar and has a deepest depth relative to the vertical axis extending along a central trough that coincides with the first set of holes across an entire length of the base, and a shallowest depth relative to the vertical axis adjacent a portion of the sidewall.

7. The container of claim 1, wherein the container is rectangular in shape and comprises a longitudinal axis that is perpendicular to the vertical axis, the longitudinal axis bisects a length of the container, and there is an unequal number of legs on opposite sides of the longitudinal axis and on opposite sides of the first set of holes.

8. The container of claim 1, wherein the first set of holes are co-linear with each other, and at least some of the second set of holes are co-linear with the legs.

9. The container of claim 1, wherein the second set of holes forms one or more planes, and wherein an orientation of at least one plane of the one or more planes is skewed from an orientation of at least one other plane of the one or more planes.

10. The container of claim 1, wherein the second set of holes are asymmetrically arrayed.

11. The container of claim 1, wherein the second set of holes comprises rows of holes, each row defines a vertical plane that extends through a center of the container, and the vertical planes are parallel to each other.

12. The container of claim 1, wherein the base is tapered toward the first set of holes in at least two directions.

13. The container of claim 1, wherein outer sides of the base taper downward toward the first set of holes such that an axially lowest portion of the base is located at a center of the base with the first set of holes, and an axially highest portion of the base is located at a portion of the sidewall.

14. The container of claim 13, wherein the container is polygonal, the sidewall comprises a plurality of sidewalls, the axially highest portion of the base extends along two of the sidewalls, and a trough extends between opposite ones of the plurality of sidewalls along the first set of holes.

15. The container of claim 1, wherein all of the holes are configured to be elevated above an underlying support surface of the legs of the container.

16. A method of stacking containers for plants, the method comprising:
providing Type A plant containers and Type B plant containers, wherein the Type A plant containers differ structurally from the Type B plant containers;
placing a first Type B plant container inside a first Type A plant container;
orienting a second Type A plant container in a direction that differs from a direction of the first Type A plant container, and placing the second Type A plant container inside the first Type B plant container;
orienting a second Type B plant container in a direction that differs from a direction of the first Type B plant container, and placing the second Type B plant container inside the second Type A plant container to form a stack of containers, such that legs of the first and second Type B plant containers and legs of the second Type A plant container extend beneath a bottom of and are visible from an exterior of the first Type A plant container.

17. A container for a plant, the container comprising:
   a body having a vertical axis, an open top, a base, a sidewall extending upward from the base, holes in the base and legs extending downward from the base, wherein the holes comprise elongated slots and apertures, and wherein at least one elongated slot intersects at least one aperture; wherein when second and third containers are stacked inside the container to form a stack of three containers, the holes in the base are positioned and shaped to receive legs of the second and third containers for enabling the legs of the second and third containers to be visible from an exterior of the container; and
   a gutter configured to collect drainage from the container, wherein the gutter has a width that fits between the legs of the container, and the gutter has a length that is greater than that of the container.

18. The container of claim 17, wherein the second and third containers are identical to the container.

* * * * *